Sept. 26, 1967     G. W. STUART     3,343,865
VEHICLE TRANSPORT
Filed Oct. 15, 1965     4 Sheets-Sheet 1
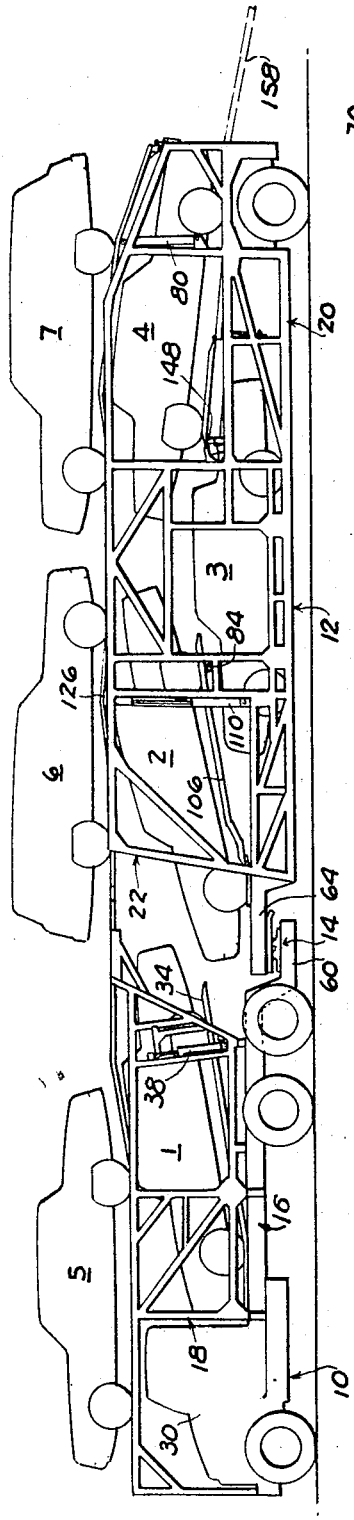
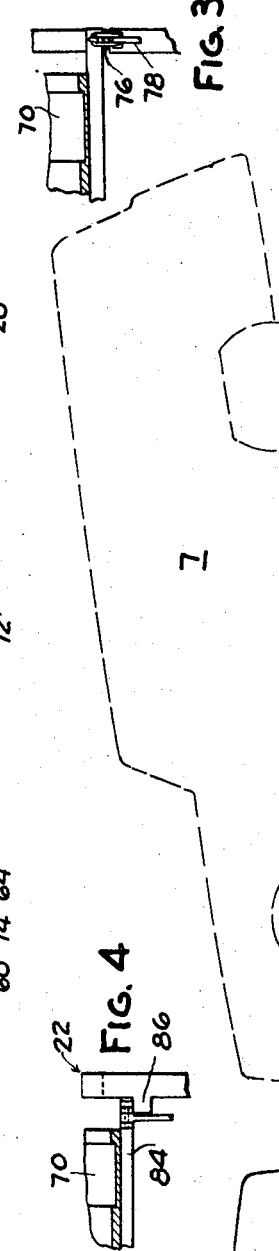
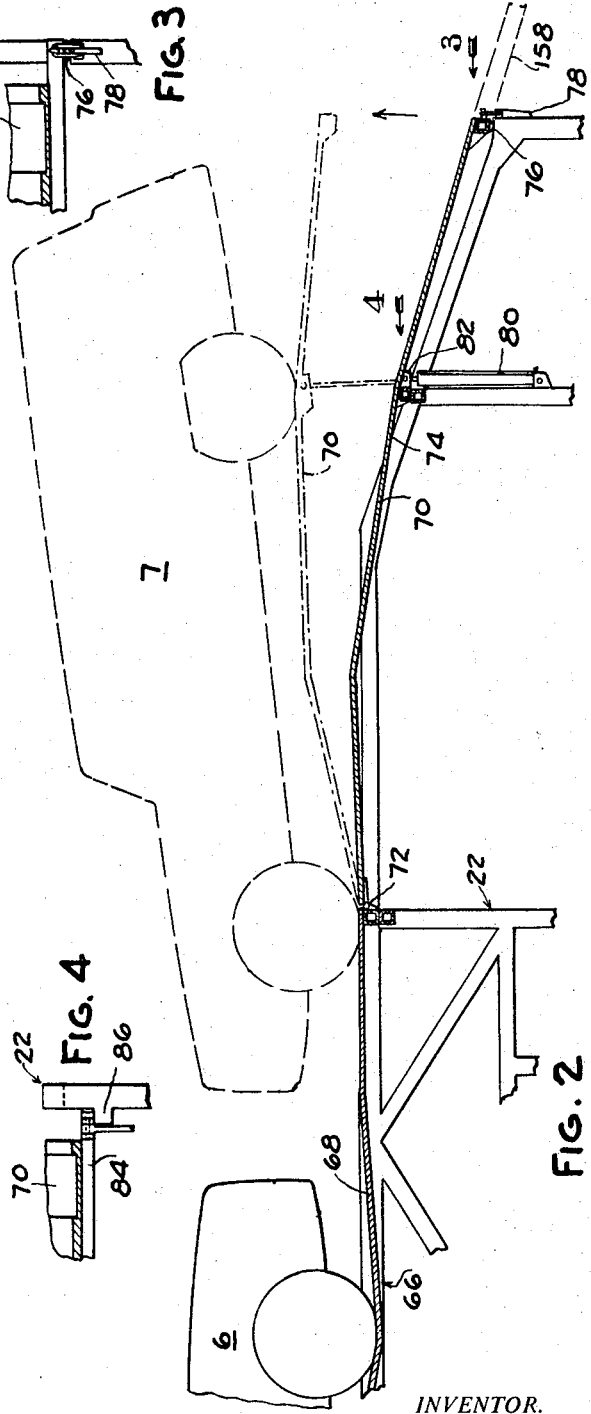
INVENTOR.
GERALD W. STUART
BY
Barnes, Kisselle, Raisch & Choate
ATTORNEYS

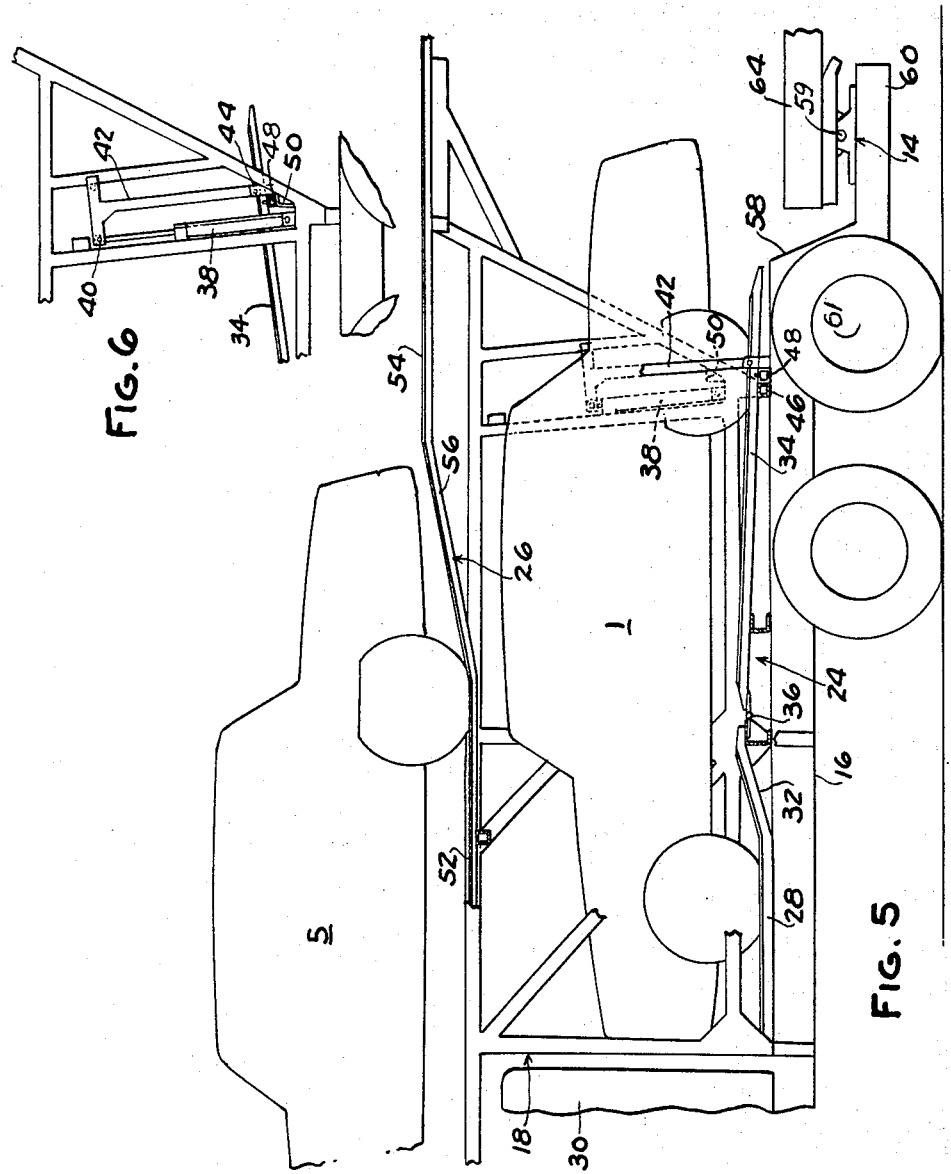

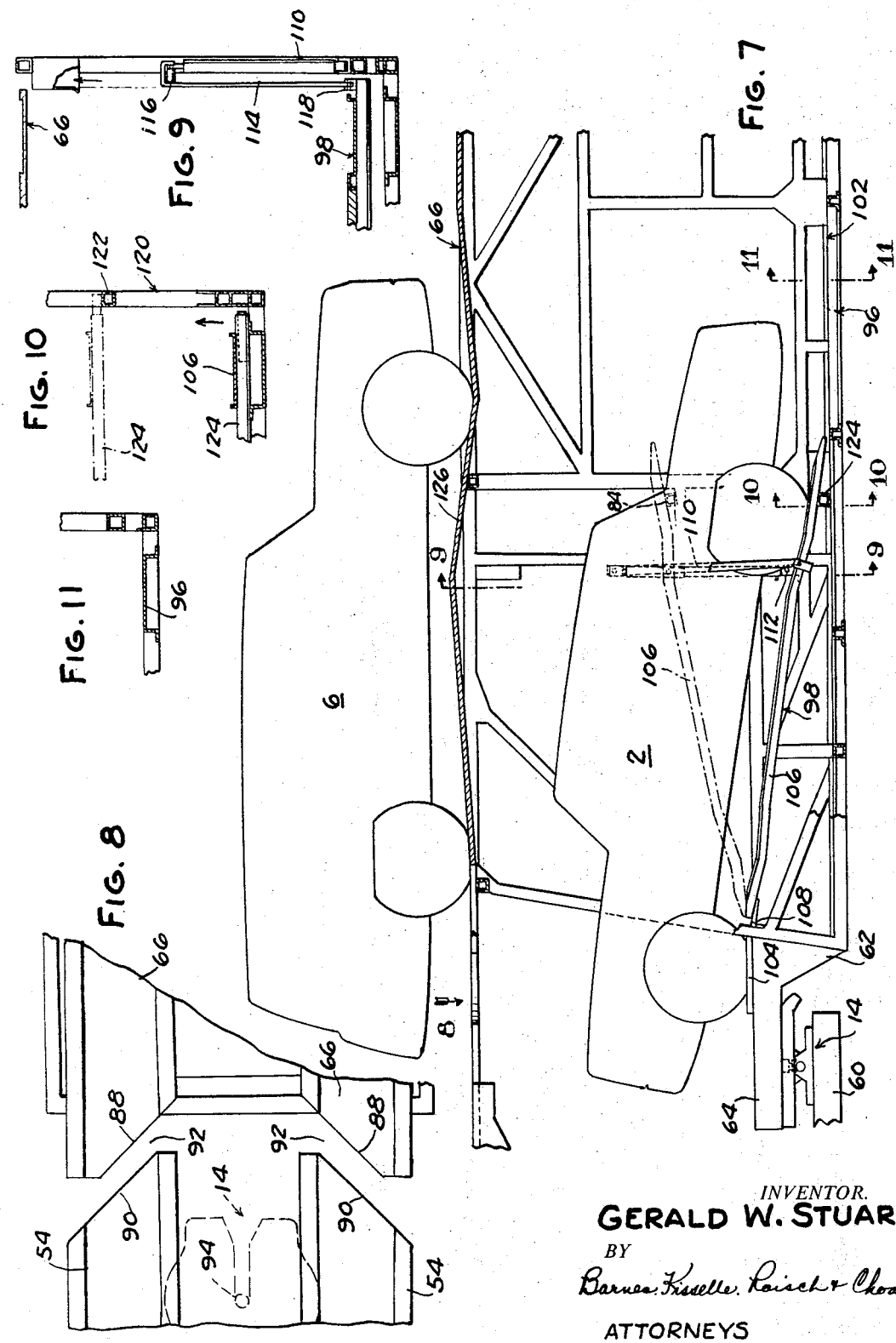

Sept. 26, 1967     G. W. STUART     3,343,865
VEHICLE TRANSPORT
Filed Oct. 15, 1965     4 Sheets-Sheet 4
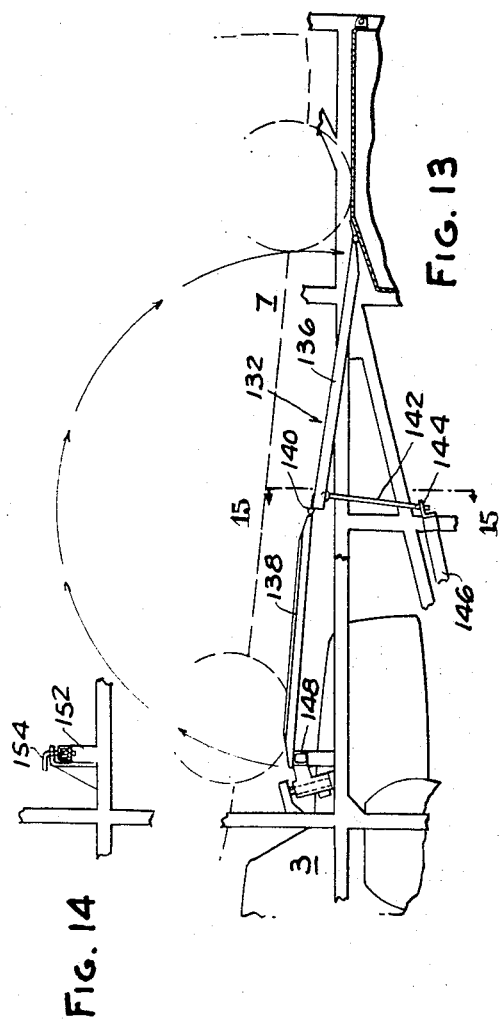
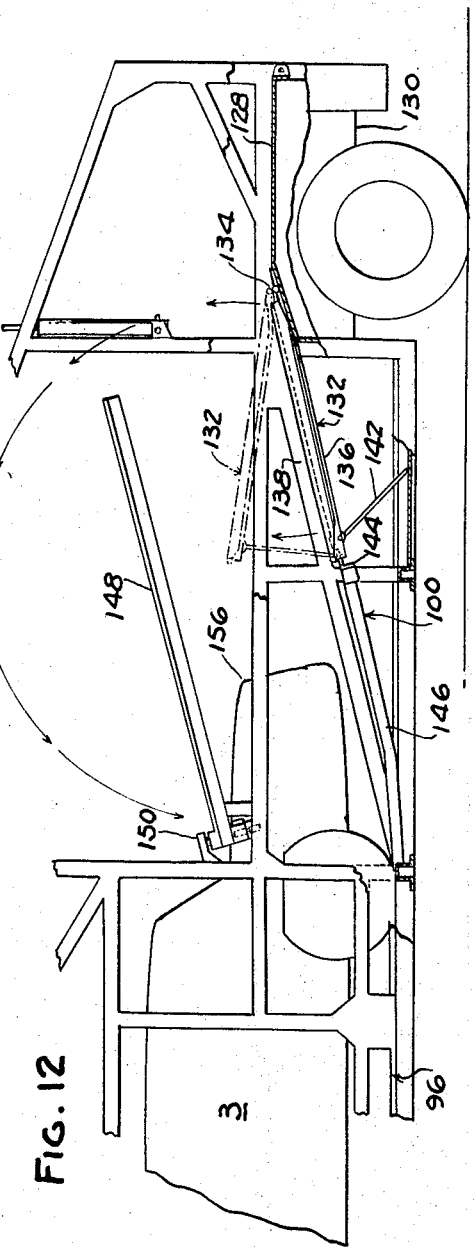
INVENTOR.
GERALD W. STUART
BY
*Barnes, Kiselle, Raisch & Choate*
ATTORNEYS

United States Patent Office 3,343,865
Patented Sept. 26, 1967

3,343,865
VEHICLE TRANSPORT
Gerald W. Stuart, Drayton Plains, Mich., assignor to Traffic Transport Engineering, Inc., Dearborn, Mich., a corporation of Michigan
Filed Oct. 15, 1965, Ser. No. 496,417
10 Claims. (Cl. 296—1)

ABSTRACT OF THE DISCLOSURE

Generally speaking the vehicle transport includes a tractor having a vehicle supporting track mounted on the frame thereof so that it can be pivoted about a forward end portion thereof from a generally horizontal position to a raised position where the vehicle inclines downwardly in a forward direction. The trailer is connected with the tractor by means of a fifth wheel which is supported at a level below the level of the tractor frame. The front end of the trailer is disposed at a level below the level of the track on the tractor when in a generally horizontal position and is provided with a track which is hinged to the front portion of the trailer so that it can be pivoted from a generally horizontal position to a position inclined downwardly in a forward direction. The trailer is also provided with a vehicle supporting track at the low center section thereof and an additional articulated track at the rear end thereof for supporting a vehicle with the upwardly facing end overlapping the vehicle supported on the low center track. The tractor is provided with a stationary ramp above the cab for supporting a fifth vehicle and the trailer is provided with two additional upper tracks for supporting the sixth and seventh vehicles.

---

This invention relates to a vehicle transport, and more particularly to a tractor-trailer unit capable of hauling seven full-size cars, two on the tractor and five on the trailer.

The various States have enacted laws which prescribe the maximum length and height limitations for transport vehicles, particularly vehicles used for hauling motor cars. In many States, a loaded vehicle may not exceed 60 feet in length and 13½ feet in height. Motor car carriers have been designed which will transport seven cars within the length and height limitations set forth above, but invariably the seven-car load must include three or four small or compact cars.

The present invention has for its object the provision of a motor-car carrier which is designed to transport seven large, luxury-size cars without exceeding the maximum length requirement of 60 feet and the maximum height requirement of 13½ feet.

A further object of the present invention resides in the provision of a motor car carrier which is designed so that it can be loaded easily in a minimum of time with a minimum of effort.

Other objects, features and advantages of the present invention will become apparent from the following description, taken in conjunction with the drawings, in which:

FIG. 1 is a side elevational view of a motor car carrier constructed in accordance with the present invention.

FIG. 2 is a fragmentary vertical sectional view of the upper rear portion of the trailer.

FIG. 3 is a fragmentary sectional view of a portion of the trailer as viewed in the direction of the arrow 3 in FIG. 2.

FIG. 4 is a fragmentary sectional view of a portion of the trailer as viewed in the direction of the arrow 4 in FIG. 2.

FIG. 5 is a fragmentary side elevational view, with parts broken away, of the rear portion of the tractor unit.

FIG. 6 is a fragmentary side elevational view of a portion of the structure shown in FIG. 5 with the lower track in the elevated position.

FIG. 7 is a fragmentary side elevational view, with parts broken away, of the front portion of the trailer.

FIG. 8 is a fragmentary top plan view, as viewed in the direction of the arrow 8, in FIG. 7.

FIG. 9 is a sectional view along the line 9—9 in FIG. 7.

FIG. 10 is a sectional view along the line 10—10 in FIG. 7.

FIG. 11 is a sectional view along the line 11—11 in FIG. 7.

FIG. 12 is a fragmentary side elevational view, with parts broken away, of the rear portion of the trailer showing the lower track in the loading position.

FIG. 13 is a view similar to FIG. 12 and showing the lower track in the transport position.

FIG. 14 is a detailed view of the support and latch structure for the hinged track-supporting crossbar.

FIG. 15 is a sectional view along the line 15—15 in FIG. 14.

Referring first to FIG. 1, the motor car carrier of the present invention comprises a tractor 10 and a trailer 12 interconnected by a fifth wheel assembly 14. Tractor 10 has a main frame 16 on which the superstructure 18 for supporting vehicles is mounted. Trailer 12 also has a main frame 20 of the drop-center or low bed type, on which the superstructure 22 is supported. As mentioned previously, the motor car carrier of this invention is adapted to transport seven cars, two on the tractor and five on the trailer. As is illustrated in FIG. 1, the seven cars are arranged primarily as a lower row and as an upper row, the cars on the lower row being identified for purposes of this description as cars 1, 2, 3 and 4, and the cars on the upper row being identified as 5, 6 and 7. All the cars illustrated in FIG. 1 are of the large, luxury-size type having a length of approximately 224 inches. Cars 1 through 6 are of more or less conventional two-door or four-door design and have a height of about 60 inches. Cars 6 and 7 are illustrated as station wagons which because of their design have a height slightly greater than cars 1 through 5. The station wagons numbered 6 and 7 have a height of about 62 inches.

Referring also now to FIGS. 2 through 5, it will be observed that the superstructure 18 on tractor 10 includes a lower track 24 and an upper track 26. Lower track 24 comprises a stationary section 28 supported directly on the main frame 16 behind the cap 30 of the tractor. At its rear end, the stationary track 28 has an incline 32 where it connects with a second track section 34 which is pivotally supported as at 36 for movement in a vertical plane. It will be appreciated that the track structures on the trailer actually include two sets of similar tracks, one along each side of the trailer. However, for purposes of brevity, only the tracks at one side of the trailer will be referred to in most instances herein.

Adjacent the rear end of the superstructure 18 there is arranged a generally vertically extending hydraulic cylinder 38 having a piston rod the upper free end of which is connected as at 40 with a depending link 42 the lower end of which is pivotally connected to the rear portion of track section 34 as at 44. As in the case of the track sections, the track-elevating cylinders are likewise provided in pairs, one at each side of the trailer. In FIG. 5, the cylinder 38 is illustrated with the piston in the retracted condition and track section 34 in the lowered position resting on a support 46 on the main trailer frame 16. In FIG. 6, cylinder 38 is illustrated with the piston in the extended position and thus track 34 in the elevated position. Track 34 is supported in the elevated position by laterally shiftable lugs 48 on track 34 which, when extended laterally outwardly, is adapted to rest on a fixed angle bracket 50 at each side of the frame superstructure 18.

As is illustrated in FIG. 1, the superstructure 18 extends forwardly over the cab 30 of the tractor to a line in vertical alignment with the front end of the tractor. Track section 26 which is supported by the upper portion of superstructure 18 includes two horizontally extending and vertically spaced track sections 52, 54 which are interconnected by an inclined track section 56. Track sections 52, 54, 56 are fixed. In the loaded condition of tractor 10, the wheels of car 5 are supported on the horizontally extending track section 52 and car 1 has its rear end elevated so that the roof of the car just clears the inclined track section 56 of the upper track 26.

Frame 16 of tractor 10 has a depending bracket structure 58 at the rear end thereof provided with a rearwardly extending horizontal portion 60 on which the fifth wheel assembly 14 is mounted. As is best shown in FIG. 5, portion 60 extends such that the horizontal articulation axis 59 of fifth wheel assembly 14 lies approximately at the level of the wheel axles as at 61. Frame 20 of trailer 12 has an upwardly extending support structure 62 at the forward end thereof provided with a forwardly extending horizontally disposed portion 64. Extension 64 overlies the fifth wheel assembly 14 and, as is illustrated in FIGS. 1 and 5, the front extension 64 is disposed at a level below the rear end of track section 34 when the latter is in the lowered position.

The superstructure 22 of trailer 12 supports an upper track 66 which consists of a fixed section 68 and a rear section 70 which is supported for pivotal movement in a vertical plane as at 72. The rear section 70 in the loaded, travelling position thereof, is downwardly inclined as at 74 with its extreme rear end supported on the superstructure 22, as at 76 and locked in place by one or more latches 78. Track section 70 is adapted to be raised by a pair of hydraulic cylinders, one of which is illustrated at 80, having a piston rod pivotally connected to track section 70 as at 82. In FIG. 2, the elevated position of track section 70 with a station wagon thereon is illustrated in broken lines. In the lowered position, track section 70 is supported at a section intermediate its ends on superstructure 22 by a crossbar 84 on which the two tracks 70 are mounted, the ends of crossbar 84 resting on lugs 86 on the trailer superstructure (FIG. 4).

While for loading purposes the forward end of the upper track 66 may be interconnected with the rear end of the upper track 26 on the tractor by a jumper track, it is preferred that these two track sections be fabricated as illustrated in FIG. 8 to avoid the necessity of using jumper tracks. As is shown in FIG. 8, the forward ends of each track 26 are cut at an incline such as is illustrated at 88 and the rear ends of each track 26 are cut complemental to the edges 88 as indicated at 90, the edges 88 and 90 being spaced apart slightly in a direction lengthwise of the trailer. The clearance between the adjacent ends of these tracks, designated 92, is sufficient to permit the trailer to swing in a horizontal plane about the pivot axis of the king-pin 94 of the fifth wheel assembly 14. The clearance space 92, however, is sufficiently short to enable the wheels of car 5 to span the spaced edges 88 and 90 as it travels into position from the trailer to the track 26 on the tractor 10.

Referring now to FIG. 7, the trailer 12 has a multi-section lower track 96 comprising a front section 98, a rear section 100 and an intermediate section 102. The intermediate section 102 is fixed and extends horizontally on the low bed of the trailer. The front section 98 of the lower track comprises two portions 104 and 106. The portion 104 is fixedly mounted on the horizontally extending portion 64 of the support bracket structure 62. Portion 106 of track 98 is pivotally connected to the support structure 62 as at 108 for movement in a vertical plane from the downwardly inclined loading position shown in solid lines in FIG. 7 to the upwardly inclined transport position shown in broken lines.

The means for elevating track portions 106 comprise a pair of cylinders 110 which are pivotally supported on the superstructure 22 as at 112. The free ends of the pistons associated with cylinders 110 are pivotally connected to a vertically extending link 114 as at 116. The lower ends of links 114 are connected to track portions 106 as at 118 (FIG. 9). In the lowered position, track portion 106 is supported at its rear end on the frame of the trailer. In the elevated position, track 106 is supported, as is shown in FIG. 10, by laterally projectable lugs 120 which rest on horizontally extending support brackets 122 on superstructure 22. Lugs 120 are telescopically arranged within the ends of a crossbar 124 which underlies and supports the two track portions 106. Track portion 106 has a length such that when the front wheels of vehicle 2 are supported on the short fixed track portions 104, the rear ends of track portions 106 extend just slightly beyond the rear wheels of vehicle 2. It will be noted in FIG. 7 that the top track 66 is arched upwardly slightly at 126 to provide clearance for the rear roof section of vehicle 2 when track 106 is elevated to the broken line position with vehicle 2 supported thereon.

Referring now to FIGS. 12 through 15, it will be seen that the rear track sections 100 comprise a horizontally extending platform portion 128 which extends in an elevated manner over the wheel housings 130 at the rear end of the trailer. At the forward end of the platform portion 28, an articulated track 132 is pivotally connected as at 134. Track 132 comprises two portions 136 and 138 which are pivotally connected together as at 140. On the underside of track portion 136 at the forward end thereof, there is pivotally supported a rectangularly shaped support bracket 142. In loading the trailer with vehicles, the articulated track 132 is arranged in the position shown in solid lines in FIG. 12 with the portion 138 pivoted into overlying, nesting relation with track portion 136. In this position, the forward end of the articulated track section 132 adjacent the pivotal connection 140 is supported on an angle bracket 144. In this condition, it forms a track extending between the forward end of the platform section 128 and the rear end of an upwardly inclined fixed track 146. The lower end of fixed track 146 joins with and extends rearwardly from the rear end of the fixed lower track 96 on the central low portion of the bed of the trailer. After vehicle 3 is loaded on the trailer, as shown in FIG. 1, and it is desired to arrange vehicle 4 as illustrated in FIG. 1, the articulated track section 132 is pivoted upwardly about its axis 134 to the broken line position shown in FIG. 12. Thereafter, support bracket 142 is swung forwardly and the lower ends thereof interengaged in sockets on angle bracket 144 as shown in FIG. 13. Then the track portion 138 can be pivoted from the nested position to the forwardly extended position shown in FIG. 13 with its forward end supported on the crossbar 148.

At one side of the trailer, crossbar 148 is hinged to the superstructure about a forwardly and upwardly inclined axis as indicated at 150. At the opposite side of the trailer, the free end of crossbar 148 is adapted to rest upon a shoe 152 and be locked in place by a retractable latch 154. The inclined hinge axis 150 is so designed that when crossbar 148 is swung from the position extending transversely of the trailer to the out-of-the-way position shown in FIG. 12, it swings in an upwardly direction and thus clears any ornament or radio antenna which might project upwardly a slight extent from the rear fenders 156 of vehicle 3.

As is clearly evident from the drawings, the superstructure 18 on the tractor 10 and the superstructure 22 on the trailer 12 consist of a plurality of upright columns interconnected by horizontally and inclined members to form a rigid frame capable of withstanding the load of the vehicles thereon. The exact design of superstructures 18 and 22 is not critical. However, the location of the various upright and inclined columns on the superstructure are preferably located so that access to the vehicle doors is permitted whenever possible to facilitate loading and unloading the unit.

In loading the seven cars illustrated on the carrier, the preferable sequence consists of loading the cars in the following succession: 5, 6, 7, 1, 2, 3, 4. The cars are first loaded on the upper tracks of the tractor and trailer, and thereafter the cars on the lower tracks of the tractor and trailer are loaded. For loading the upper tracks, a conventional loading ramp such as indicated at 158 in FIG. 2 is extended from the lower end of track 70 to the ground surface at a moderate incline. Car 5 is then driven forwardly up ramp 158, over tracks 70 and 66 and onto track 26 on the tractor so that vehicle 5 in its transport condition is located above the cab 158 of the tractor. Vehicle 6 is then backed up ramp 158 and over track 70 to locate it on track 66 in the position shown in FIG. 1 with the rear end thereof overhanging the adjacent ends of the upper tracks on the tractor and trailer. Car 6 is located in a rearwardly facing direction on the trailer as illustrated because most conventional cars, and particularly the large, luxury-size cars, have a substantially greater overhang beyond the rear wheels than they have extending forwardly from the front wheels. If car 6 were located on the upper track of the trailer in a forwardly facing position, the longer overhang at the rear of the vehicle would require a forward extension of the upper track on the trailer, and create interference problems when the trailer is being turned.

Car 7 is then driven forwardly onto track 70 to the position indicated in FIG. 1. In the case of a station wagon, which is the illustrated embodiment of car 7, it is essential that the car be driven forwardly onto track 70. If it were backed on, the rear roof portion of the car would probably project upwardly beyond the maximum height restriction of 13½ feet. In the case of a conventional car, where the roof structure is located only at the central portion of the car and the front and rear ends are substantially lower, car 7 could be either backed on or driven on forwardly.

After cars 5, 6 and 7 are loaded on the upper tracks of the tractor and trailer, as illustrated, they may be tied down in the conventional manner to compress the springs thereof. The job of tying down the cars on the upper tracks is rendered relatively simple by reason of the fact that no cars as yet have been loaded on the lower tracks of the tractor and trailer.

After cars 5, 6 and 7 have been tied down, the lower tracks of the tractor and trailer may be loaded. Initially, rear upper tracks 70 are elevated by energizing cylinders 80 to lift the track and vehicle 7 thereon to the position shown in FIG. 2. Loading ramp 158 is then attached to the rear end of the trailer at the level of the rear platform section 128. Articulated track 132 is collapsed to the solid line position shown in FIG. 12, and the crossbar 148 is swung to the out-of-the-way position illustrated in FIG. 12. Forward track portion 106 is in the lowered positon illustrated by solid lines in FIG. 7 and short jumper tracks are extended between the forward ends of the short fixed track portions 104 and the rear ends of the lower tracks 34 on the tractor. With the tracks arranged in the above-described manner, car 1 may be driven forwardly through the trailer and onto track 24 on the tractor to the position illustrated in FIG. 5. Thereafter, cylinders 38 are energized to elevate car 1 to the position shown in FIG. 1. In this position, the roof of car 1 lies closely adjacent the inclined track portion 56 just to the rear of the wheels of car 5 on the upper track.

Car 2 is then driven forwardly through the trailer to the position illustrated in FIG. 7 wherein the front wheels of the car are supported on the short horizontally extending and stationary track portions 104 on the support extension 64. Since the tractor and the trailer are aligned in a straight line, there is no interference between the front fenders of car 2 and the rear ends of track sections 34. Thereafter, cylinders 110 are energized to elevate track portions 106 and thereby elevate the rear end of car 2 and pivot the forward end thereof downwardly. Car 2 thus assumes the position illustrated in FIG. 1, wherein the forward overchanging end thereof is nested vertically between the rear overhanging portion of car 1 and the dropped fifth wheel assembly 14. With car 2 arranged in this manner, the front ends of the fenders on car 2 just clear below the rear overlying ends of the elevated tracks 134 when the tractor and trailer negotiate a sharp turn. It will be appreciated, of course, that when the trailer negotiates a sharp turn, car 2 assumes a position extending substantially transversely to car 1 and tracks 34 on which the rear wheels thereof are supported.

The raising of tracks 106 not only nests the forward end of car 2 between the rear ends of tracks 34 and fifth wheel assembly 14, but also elevates the rear portion of car 2 to accommodate the front lower portion of car 3 below the rear end and wheels of car 2. Car 3 is shown driven into the trailer forwardly. However, in the case of a two-door vehicle, car 3 can be backed into the trailer if desired.

After car 3 is arranged on the trailer as shown in FIG. 1, crossbar 148 is swung from the position shown in FIG. 12 to a position extending transversely of the trailer. Thereafter, the articulated track section 132 is swung upwardly about the pivot axis 134 and support bracket 142 is engaged with angle bracket 144 to support the track in the broken line position illustrated in FIG. 12. The portion 138 of articulated section 132 is then pivoted upwardly and forwardly so that the front end thereof rests upon the crossbar 148. Crossbar 148 overlies the rear deck of vehicle 3. After the articulated track section 132 is arranged as described, vehicle 4 is backed into the trailer to the position shown in FIG. 4, so that the rear wheels of vehicle 4 are disposed above the rear deck of car 3 and the rear overhanging end of vehicle 4 overlies the raised central roof section of vehicle 3. Thereafter, the pressure in cylinders 80 may be released to lower the rear track sections 70 which may be locked in their lowered transport position by latches 78. After cars 1, 2, 3 and 4 are tied down, the unit is fully loaded and ready for transport.

The loaded vehicle arrangement herein described and illustrated in FIG. 1 conforms to the length restriction of 60 feet and the height restriction of 13½ feet. Furthermore, this vehicle arrangement results in a favorable load distribution on the rear axles of the tractor. Since cars 1 and 5 are located on the tractor front end foremost, the load on the rear axles of the tractor is minimized so that the king-pin loading on these axles will not exceed the maximum allowable limits. The load on the trailer, of course, produces a cantilever loading on the rear axles of the tractor. Shifting the load on the tractor forwardly also provides a more stable steering condition for the front wheels of the tractor.

I claim:

1. A seven-car vehicle carrier comprising a tractor and a trailer, the tractor having a main frame with a cab at the front end thereof, a lower vehicle track on said frame behind said cab, said track being pivotally supported adjacent its front end such that the rear end thereof can be elevated to a position above the level of the frame, the tractor frame having a depending support at the rear end thereof, a fifth wheel assembly on said depending support, said trailer having a main frame the front end of which is connected with said fifth wheel assembly such that the front end portion of the trailer frame is disposed at a level below the rear end of the lower track on the tractor when the latter is in lowered position, said trailer having a front lower track the front end of which is supported on said front portion of the trailer frame at a level below the rear end of the lower track on the tractor, the front lower track on the trailer being supported adjacent its front end for pivotal movement from a downwardly and rearwardly inclined position to an upwardly and rearwardly inclined position whereby when a vehicle is positioned on the lower track of the tractor front end foremost with its rear end overhanging the rear end of the tractor frame and the rear end thereof is elevated by pivoting the rear end of the lower track on the tractor upwardly, a second vehicle may be positioned on the lower forward track of the trailer front end foremost with its front end disposed vertically intermediate the rear overhanging end of the first vehicle and the fifth wheel assembly, said trailer also having a low, generally horizontal track at the central portion thereof and a rear track pivotally supported adjacent its rear end near the rear end of the trailer for movement in a vertical plane such that a third vehicle can be positioned on the low central track and a fourth vehicle on the rear track with the opposed inner ends of the forward and rear tracks on the trailer elevated to clear the front and rear ends of the third vehicle, said tractor also having an upper track for supporting a fifth car in a position overlying the cab and a portion of said first vehicle, and the trailer also having an upper track for supporting sixth and seventh vehicles in positions overlying the second and fourth vehicles.

2. The combination set forth in claim 1, wherein said rear lower track on the trailer comprises a pair of track sections pivotally connected end to end with the forward section pivotable from a position overlying the rear section such that the rear lower track can be pivoted upwardly to clear the rearwardly facing end portion of said third vehicle and to a forwardly extended position overlying the rearwardly facing end portion of the third vehicle.

3. The combination set forth in claim 1, wherein said rear lower track on the trailer comprises a forward section and a rear section, the rear section being pivotally connected to the trailer adjacent its rear end and the forward section being movable to a position directly overlying the rear section to enable pivoting of said rear track upwardly to clear the rearwardly facing end portion of said third vehicle and to a forwardly extended position overlying the rearwardly facing end portion of the third vehicle.

4. The combination set forth in claim 1 wherein the rear portion of the upper track on the trailer is supported such that said rear portion of the upper trailer track can be elevated to provide sufficient clearance for loading vehicles on the lower track of the trailer.

5. A seven-car vehicle carrier comprising a tractor and a trailer, the tractor having a main frame with a cab at the front end thereof, a lower vehicle track on said frame behind said cab, the rear end portion of said track being adapted to be raised to a position above the level of the frame, the tractor frame having a depending support at the rear end thereof, a fifth wheel assembly on said depending support, said trailer having a main frame the front end of which is connected with said fifth wheel assembly such that the front end portion of the trailer frame is disposed at a level below the rear end of the lower track on the tractor when the latter is in lowered position, said trailer having a front lower track the front end of which is supported on said front portion of the trailer frame at a level below the rear end of the lower track on the trailer, the rear portion of the front lower track on the trailer being adapted to be raised to tilt a vehicle supported thereon to a position inclined forwardly and downwardly of the trailer, whereby when a vehicle is positioned on the lower track of the tractor front end foremost, with its rear end overhanging the rear end of the tractor frame and the rear end thereof is raised by raising the rear end of the lower track on the tractor, a second vehicle may be positioned on the lower forward track of the trailer front end foremost with its front end disposed vertically intermediate the rear overhanging end of the first vehicle and the fifth wheel assembly, said trailer also having a low, generally horizontal track at the central portion thereof for supporting a third vehicle and a rear lower track adjacent the rear end thereof, said rear track being adapted to be extended to a position wherein the front portion thereof overlies the rearwardly facing end portion of said third vehicle whereby when a third vehicle is arranged on said low, generally horizontal track at the central portion of the trailer with one end thereof underlying the rear overhanging end of the second vehicle, a fourth vehicle can be positioned on the extended lower rear track with the forward portion thereof overlying the rearwardly facing portion of the third vehicle, said tractor also having an upper track for supporting a fifth car in a position overlying the cab and a portion of said first vehicle, and the trailer also having an upper track for supporting sixth and seventh vehicles in positions overlying the second and fourth vehicles.

6. The combination set forth in claim 5, wherein the depending support at the rear end of the tractor frame extends downwardly to a plane below the wheel axis of the tractor.

7. The combination set forth in claim 5, wherein the horizontal axis of articulation of the said fifth wheel assembly lies in a horizontal plane closely adjacent the level of the tractor wheel axis.

8. The combination set forth in claim 5, including means adapted to be extended transversely of the trailer for supporting the forward end of said rear lower track over the rear end portion of the third vehicle.

9. The combination set forth in claim 5, wherein said rear lower track on the trailer comprises two sections pivotally connected end to end such that they can be collapsed to a position overlying one another, one of said sections being pivotally supported at its rear end adjacent the rear end of the trailer such that in the collapsed position thereof the rear lower track can be pivoted upwardly to clear the rearwardly facing end of the third vehicle and thereafter said rear lower track sections can be extended to overlie the rearwardly facing end portion of the third vehicle.

10. The combination set forth in claim 9, including means for supporting the front end portion of said one track section in an elevated position adjacent its pivotal connection with the other track section and means for supporting the free end portion of said other track section in its extended position over the rearwardly facing end portion of said third vehicle.

References Cited
UNITED STATES PATENTS

| | | | |
|---|---|---|---|
| 1,643,885 | 9/1927 | Gill | 296—1 |
| 2,096,455 | 10/1937 | Francis | 296—1 |
| 3,163,459 | 12/1964 | Gyori | 296—1 |

BENJAMIN HERSH, *Primary Examiner.*

PHILIP GOODMAN, *Assistant Examiner.*